United States Patent
Ehrhart et al.

(10) Patent No.: US 9,708,056 B2
(45) Date of Patent: Jul. 18, 2017

(54) WHEEL DRIVE UNIT FOR ATTACHMENT TO AN AIRCRAFT RUNNING GEAR

(71) Applicant: L-3 Communications Magnet-Motor GmbH, Starnberg (DE)

(72) Inventors: Peter Ehrhart, München (DE); Johann Oswald, Eschenlohe (DE)

(73) Assignee: L-3 COMMUNICATIONS MAGNET-MOTOR GMBH, Starnberg (DE)

(*) Notice: Subject to any disclaimer, the term of this patent is extended or adjusted under 35 U.S.C. 154(b) by 0 days.

(21) Appl. No.: 14/651,642

(22) PCT Filed: Dec. 14, 2012

(86) PCT No.: PCT/EP2012/075599
§ 371 (c)(1),
(2) Date: Jun. 11, 2015

(87) PCT Pub. No.: WO2014/090334
PCT Pub. Date: Jun. 19, 2014

(65) Prior Publication Data
US 2015/0314863 A1 Nov. 5, 2015

(51) Int. Cl.
*B64C 25/50* (2006.01)
*B64C 25/40* (2006.01)
*B64C 25/34* (2006.01)

(52) U.S. Cl.
CPC ............ *B64C 25/405* (2013.01); *B64C 25/34* (2013.01); *Y02T 50/823* (2013.01)

(58) Field of Classification Search
CPC .................. B64C 25/34; B64C 25/405
See application file for complete search history.

(56) References Cited

U.S. PATENT DOCUMENTS

| 3,762,670 A | 10/1973 | Chillson |
| 8,191,821 B2 | 6/2012 | Knight |

(Continued)

FOREIGN PATENT DOCUMENTS

| EP | 2 394 912 A1 | 12/2011 |
| RU | 2466316 C2 | 11/2012 |

(Continued)

*Primary Examiner* — Richard G Davis
(74) *Attorney, Agent, or Firm* — Seed Intellectual Property Law Group LLP

(57) ABSTRACT

Wheel drive unit for attachment to an aircraft running gear, said wheel drive unit including a drive motor or a drive motor with subsequent transmission and comprising the following features: (a) a mounting component adapted to be mounted to a supporting component of the aircraft running gear; (b) a coupling component releasably anchored to the mounting component in non-rotatable fashion; (c) the drive motor being supported by means of the coupling component such that the coupling component provides for torque support of the drive motor; (d) and a pluggable connection for connecting at least one pair of electric line sections and/or at least one pair of fluid line sections; (e) the torque output of the drive motor or of the subsequent transmission being adapted to establish a torque-transmitting connection to a wheel of the aircraft running gear when the wheel drive unit is attached to the aircraft running gear; (f) and the wheel drive unit—without the mounting component—, when the anchoring to the mounting component is released, being demountable from the aircraft running gear which also separates the two parts of the pluggable connection from each other.

21 Claims, 8 Drawing Sheets

(56) References Cited

U.S. PATENT DOCUMENTS

| | | | |
|---|---|---|---|
| 9,169,005 B2 | 10/2015 | Oswald et al. | |
| 2007/0257570 A1* | 11/2007 | Walter | B60K 7/0007 310/67 R |
| 2011/0297786 A1* | 12/2011 | Sweet | B64C 25/405 244/103 R |
| 2011/0304292 A1 | 12/2011 | Charuel et al. | |
| 2013/0062466 A1* | 3/2013 | Sweet | B64C 25/405 244/103 R |

FOREIGN PATENT DOCUMENTS

| | | |
|---|---|---|
| WO | 95/29094 A1 | 11/1995 |
| WO | 2009/141550 A2 | 11/2009 |
| WO | 2011/134503 A1 | 11/2011 |
| WO | 2014/090334 A1 | 6/2014 |

* cited by examiner

WHEEL DRIVE UNIT FOR ATTACHMENT TO AN AIRCRAFT RUNNING GEAR

BRIEF SUMMARY

One subject matter or embodiment of the invention is a wheel drive unit for attachment to an aircraft running gear, said wheel drive unit including a drive motor or a drive motor with subsequent transmission and comprising the following features:

(a) a mounting component adapted to be mounted to a supporting component of the aircraft running gear on which supporting component at least one wheel of the aircraft running gear is supported so as to be rotatable about the central axis of the supporting component;

(b) a coupling component releasably anchored to the mounting component and non-rotatably fixed by engagement with the mounting component or the supporting component of the aircraft running gear;

(c) the drive motor or the drive motor with subsequent transmission being supported by means of the coupling component such that the coupling component provides for torque support of the drive motor or of the drive motor with subsequent transmission;

(d) and a pluggable connection for connecting at least one pair of electric line sections and/or at least one pair of fluid line sections, a first part of the pluggable connection being associated with the mounting component and a second part of the pluggable connection being associated with the coupling component;

(e) the torque output of the drive motor or of the subsequent transmission being adapted to establish a torque-transmitting connection to a wheel of the aircraft running gear when the wheel drive unit is attached to the aircraft running gear;

(f) and the wheel drive unit—without the mounting component —, when the anchoring to the mounting component is released, being demountable from the aircraft running gear which also separates the two parts of the pluggable connection from each other.

In more recent times, there are endeavors being made for developing wheel drive units for attachment to an aircraft undercarriage or running gear. Such wheel drive units permit the aircraft or airplane to be rollingly moved on the ground without being dependent on the propulsive power of the aircraft engines. Typical examples are the "taxiing" of the aircraft on its way from the passenger terminal to the starting point of the runway, as well as "taxiing" of the aircraft after touchdown from the runway to the passenger terminal. By way of one or more wheel drive units, an airplane on the ground can be rollingly moved in considerably more energy-efficient manner than with the aid of the aircraft engine or engines.

Wheel drive units for attachment to an aircraft running gear should be as light as possible (in order to increase the own weight of the aircraft as little as possible) and should take as little space as possible (in order to increase the space requirement of the aircraft running gear as little as possible or not at all). A wheel drive unit including a drive motor with subsequent transmission is favorable under this aspect.

The term "(subsequent) transmission" used in the present application/patent designates any type of torque transmission, either without a change of rotational speed, or with an increase or a reduction of rotational speed; a transmission with a reduction of rotational speed advantageous in many cases. Transmissions having teethed wheels are a good solution in many cases.

The inventors of the present invention have endeavored to meet the object of making available a wheel drive unit for attachment to an aircraft undercarriage or running gear, which requires as little alterations as possible, or no alterations at all, to the aircraft running gear. The drive wheel drive unit meeting this object can be attached—by way of retrofitting—to the aircraft running gear in simple manner. For attachment to new airplanes to be produced, it is necessary at the most to effect minor changes to existing running gear constructions, thus reducing the development costs and facilitating possibly necessary admission procedures.

The wheel drive unit according to one embodiment of the invention can be attached easily to an aircraft running gear by first attaching the mounting component to the supporting component of the aircraft running gear. The coupling component can be expediently anchored at this "anchoring point", thus effecting a non-rotatable fixation of the coupling component either by engagement with the mounting component or by engagement with the supporting component of the aircraft running gear. The coupling component supports the drive motor or the drive motor with the subsequent transmission such that the coupling component provides for torque support of the drive motor or the drive motor with subsequent transmission. As regards the pluggable connection mentioned, a first part thereof is associated with the mounting component and a second part thereof is associated with the coupling component, so that the pluggable connection is closed or established when the coupling component is anchored to the mounting component, and the pluggable connection is released when the coupling component is demounted from the mounting component. When the wheel drive unit is attached to the aircraft running gear, there is a permanent or an interruptible torque-transmitting connection between torque output of the drive motor or of the subsequent transmission to a wheel of the aircraft running gear.

It is one of the significant advantages of the wheel drive unit according to one or more embodiments of the invention that the coupling component along with the drive motor or drive motor with subsequent transmission, respectively, can be demounted easily from the mounting component and thus also from the aircraft running gear. As already mentioned, the two parts of the pluggable connection are separated thereby as well. The demounting operation in its entirety can be performed very rapidly, which in particular entails the advantage that the aircraft running gear wheel driven by the drive motor or the drive motor with subsequent transmission can be changed almost within the same time as in case of an aircraft running gear without wheel drive unit. In view of the high wheel wear, wheels of aircraft running gears have to be replaced relatively often. The ground time of an airplane always is to be kept as short as possible as the flying airplane generates revenue, and not the airplane on the ground.

A further subject matter or embodiment of the invention is a wheel drive unit for attachment to an aircraft running gear, said wheel drive unit including a drive motor or a drive motor with subsequent transmission and comprising the following features:

(a) a coupling component adapted to be mounted in non-rotatable fashion to a supporting component of the aircraft running gear on which supporting component at least one wheel of the aircraft running gear is supported so as to be rotatable about the central axis of the supporting component;

(b) the drive motor or the drive motor with subsequent transmission being releasably supported by means of the coupling component such that the coupling component provides for torque support of the drive motor or of the drive motor with subsequent transmission;

(c) and a pluggable connection for connecting at least one pair of electric line sections and/or at least one pair of fluid line sections, a first part of the pluggable connection being associated with the supporting component of the aircraft running gear and a second part of the pluggable connection being associated with the coupling component;

(d) the torque output of the drive motor or of the subsequent transmission being adapted to establish a torque-transmitting connection to a wheel of the aircraft running gear when the wheel drive unit is attached to the aircraft running gear;

(e) and the wheel drive unit, by release of the mounted state of the coupling component on the supporting component of the aircraft running gear, being demountable from the aircraft running gear which also separates the two parts of the pluggable connection from each other.

The wheel drive unit indicated in the preceding paragraph differs from the wheel drive unit indicated in the first paragraph of the description in that it has no mounting component. It is suitable for such attachment situations in which the supporting component of the aircraft running gear is designed to have the coupling component mounted thereto—so to speak directly. The pluggable connection now is located between the coupling component and the supporting component of the aircraft running gear. As for the rest, the statements made hereinbefore in relation to the wheel drive unit indicated in the first paragraph of the specification are applicable again as regards the underlying object and the advantages of the solution according to one embodiment of the invention.

It is possible that the drive motor is an electric motor, in particular an electronically commutated electric motor composed with permanent magnets, or a hydraulic motor or a compressed air motor. It is possible to provide a planetary gear unit as subsequent transmission.

In the wheel drive unit according to the invention (according to the first subject matter of the invention or according to the further subject matter of the invention), which may contain one or, at the same time, plural ones of the specific design features described hereinbefore, the supporting component of the aircraft running gear may have the configuration of a hollow shaft. Such a hollow shaft can have the mounting component, or the coupling component directly, mounted thereto in simple and expedient manner. Moreover, some of the existing aircraft running gears have one or several supporting components for one or several wheels, having the configuration of a hollow shaft so that in so far only slight modifications of the supporting component are necessary in order to make the same suitable for attachment of the wheel drive unit.

In the wheel drive unit according to the invention (according to the first subject matter of the invention or according to the further subject matter of the invention), which may contain one or, at the same time, plural ones of the specific design features described hereinbefore, the non-rotatable connection between the coupling component and the mounting component or between the coupling component and the supporting component of the aircraft running gear may be a spline shaft connection. The term "spline shaft connection" in the present application is to comprise all kinds of connections affording in the assembled state a non-rotatable fixation of the two connection partners relative to each other, but being releasable from each of the by way of axial relative movement of the two connection partners (which is not cogently a purely axial relative movement or a movement comprising solely the axial relative movement). The outline of the spline shaft connection visible in cross-section is of no particular relevance. Typically it may be an outline similar to gear teeth or an outline having a plurality of circumferentially distributed grooves, to name just two examples.

In the wheel drive unit according to the invention (according to the first subject matter of the invention), which may contain one or plural ones of the specific design features described hereinbefore, there may be provided at least one mounting bolt extending from the outside of the wheel drive unit facing away from the mounting component to the opposite outside of the mounting component, with the drive motor or the drive motor with subsequent transmission being clamped together with the mounting component, sandwiching the coupling component therebetween, by means of the at least one mounting bolt. In particular, it is possible to employ just one single, central mounting bolt, however, it is also possible to provide a plurality of mounting bolts, in particular in circumferentially distributed positions. The use of at least one mounting bolt, as described in the present paragraph, is alternatively possible for anchoring the coupling component directly to the supporting component of the aircraft running gear (wheel drive unit according to the further subject matter of the invention).

In the wheel drive unit according to the invention (according to the first subject matter of the invention or according to the further subject matter of the invention), which may contain one or, at the same time, plural ones of the specific design features described hereinbefore, the pluggable connection may comprise one or, at the same time, plural ones of the following features listed under (a) to (f) hereinbelow:

(a) The pluggable connection is designed to connect several pairs of electric power line sections for the electric motor;

(b) the pluggable connection is designed to connect at least two pairs of hydraulic line sections for the hydraulic motor or at least one pair of compressed air line sections for the compressed air motor;

(c) the pluggable connection is designed to connect at least one pair of electric signal line sections;

(d) the pluggable connection is designed to connect at least one pair of fluid line sections for liquid or gaseous cooling fluid;

(e) at least one of the two parts of the pluggable connection is provided with a shield for reducing electromagnetic radiation;

(f) the pluggable connection is designed as an integral overall pluggable connection comprising all terminals provided for the wheel drive unit.

It can be seen that in situation (f), demounting of the coupling component along with the drive motor or along with the drive motor and the subsequent transmission can be accomplished in particularly simple and rapid manner, especially when one wheel or several wheels of the aircraft running gear are to be changed or replaced.

When the pluggable connection comprises terminals for liquid or gas, at least part of these terminals can be of self-closing design, i.e., upon separation of the respective pluggable connection, the liquid or gas volume present behind the terminal in the corresponding line can be closed off with respect to the environment, so that there is no liquid or gas leakage—possibly apart from a slight initial amount—when the pluggable connection is separated.

When the pluggable connection comprises terminals for liquid or gas, at least part of the terminals can be of self-venting design, i.e., minor amounts of air that have entered such terminals upon separation of the pluggable connection, upon subsequent mating of the pluggable connection, are automatically vented to the environment and do not remain in the terminals and the adjoining line system, respectively.

Self-closing terminals or pluggable connections and self-venting terminals or pluggable connections or line sections are known to the person skilled in the art and available in the market, so that there is no need to describe the same in more detail here.

Express disclosure is herewith given to the effect that the inventive wheel drive unit (according to the first subject matter of the invention or according to the further subject matter of the invention) can also be designed for attachment to another vehicle, which is not an airplane. Typical examples of such other vehicles are non-railbound land vehicles, such as trucks, buses and passenger vehicles. In that event, the mounting component, or the coupling component directly, is designed for attachment to a chassis component of the non-railbound land vehicle (instead of to the supporting component of the aircraft running gear); the torque output of the drive motor or of the subsequent transmission is adapted to establish a torque-transmitting connection to a wheel of the non-railbound land vehicle.

It is emphasized that it is possible with embodiments of the invention to design a component that is present anyway in the wheel drive unit, in particular a housing of the drive motor or of the transmission or a housing of drive motor and transmission, at the same time as coupling component. An example are means on said housing that permit non-rotatable, positive or form-fit engagement with complementary means on the mounting component or directly on the supporting component, respectively.

BRIEF DESCRIPTION OF THE SEVERAL VIEWS OF THE DRAWINGS

The invention will be described in more detail in the following by way of exemplary embodiments shown in the drawings in partly schematic manner. In the drawings.

DETAILED DESCRIPTION

Figure 1:
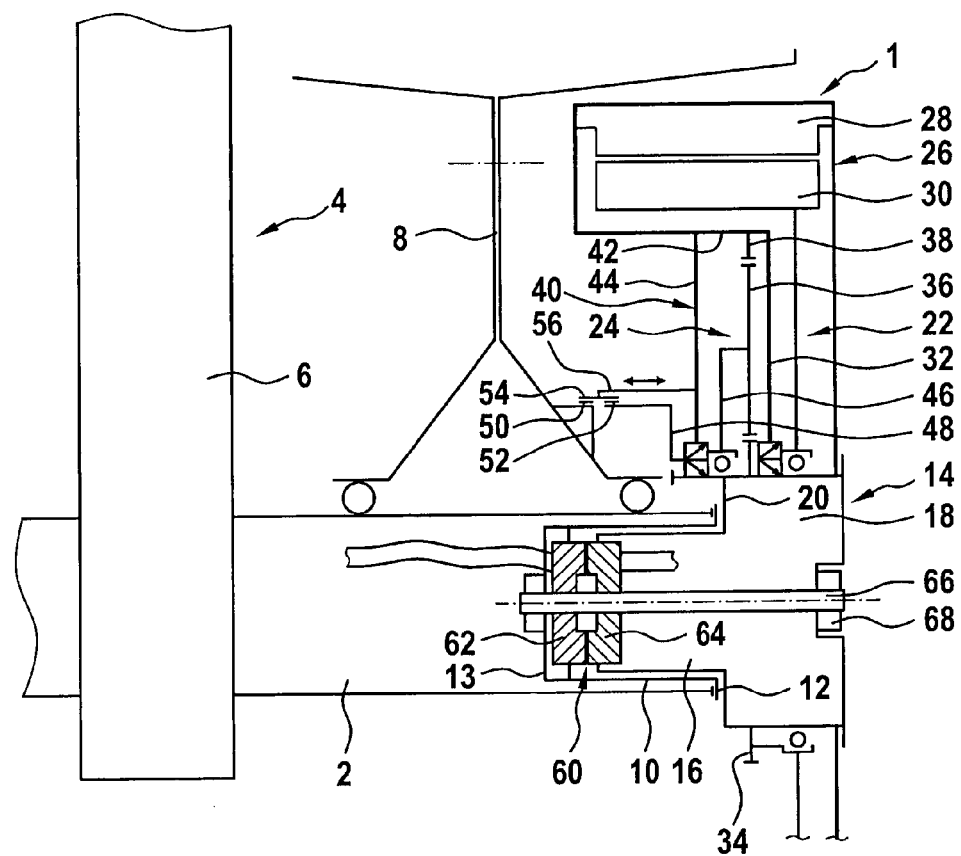
FIG. 1 shows a wheel drive unit in the attached state in a sectional view containing the central axis of the wheel drive unit, with part of the wheel drive unit being cut away.

FIG. 1 is a schematic view. More in the left part of the drawing, there can be seen a supporting component 2 of an aircraft running gear 4. The supporting component 2 has the configuration of a hollow tube of considerable diameter, e.g., 15 to 40 cm. Only part of the aircraft running gear 4 is illustrated in the drawing. The suspension strut 6 illustrated is mounted to the airplane above the illustration of FIG. 1. To the left of the suspension strut 6, there is present a second supporting component 2 in mirror symmetrical manner. Such aircraft running gears 4 can be found, e.g., as aircraft nose gear or central gear below a wing of not too large airplanes.

The supporting component 2 illustrated rotatably supports a wheel 4 of the aircraft running gear 4, which holds for the left side (not shown) in mirror symmetrical manner as well.

A mounting component 10 is inserted into the supporting component 2 from the in FIG. 1 right-hand open face end of the supporting component 2. The mounting component 10 is in the form of a pot-shaped cylindrical sleeve having a radially outwardly projecting collar 12 at the right-hand end in FIG. 1. The bottom of sleeve 10 bears reference numeral 13. The mounting component 10 is fixed to the supporting component 2 both in non-rotatable and in axially fixed manner, e.g., by means of a nut, not shown, threaded onto the end portion of the supporting component 2 and urging the collar 12 against the face end of the supporting component 2 via a shoulder.

A coupling component 14 engages with the mounting component 10. The coupling component 14 has a first cylindrical section 16 of smaller diameter and a second cylindrical section 18 of larger diameter. First section 16 is slidingly introduced into the interior of the mounting component 10 and non-rotatably held in mounting component 10. This non-rotatable fixation can be effected in particular by a spline shaft connection between the outer circumference of the first section 16 and the inner circumference of the mounting component 10. Another possibility consists in providing several radially extending tongue and groove engagements between the right-hand end face of collar 12 and a shoulder 20 of the coupling component 14 at the transition between the first section 16 and the second section 18.

At the outer circumference of the coupling component 14, specifically at the outer circumference of the second section 18 and a cylindrical wall extended therefrom towards the left, there are attached a drive motor 22 and a transmission 24. In the present embodiment, the drive motor 22 is a permanent-magnet electric motor. The electric motor 22 comprises a housing 26, a radially outer stator 28 with windings on stator teeth, not shown, and a radially inner rotor 30 having the permanent magnets disposed on the outer circumference thereof. Rotor 30 is supported on the outside of the coupling component 14. The timely activation and deactivation of the stator windings and the power supply to the stator windings are effected by electronic components.

Transmission 24 in the present embodiment is a planetary gear system. A hollow shaft extends from the radially inner end portion of rotor 30 through a partition 32 formed by motor housing 26, into the transmission 24 and has its inner end portion formed as sun gear 34 of transmission 24. Sun gear 34 meshes with a plurality of circumferentially distributed planetary gears 36. Radially outside, the planetary gears 36 mesh with ring gear teeth 38 formed on the inner circumference of the housing 40 of transmission 24. The housing 40 of transmission 24 is constituted in part by housing portions of the housing 26 of electric motor 22, namely by the afore-mentioned partition 32 and a circumferential partition 42. On the left-hand side, transmission housing 40 is completed by a further wall 44.

The planetary gears 36 are all supported on a common planetary gear carrier 46 so as to be rotatable about their own axis each. The planetary gear carrier 46 performs a revolving motion with a lower speed or number of revolutions than sun gear 34. The planetary gear carrier 46 is supported on the outside of the coupling component 14. From the radially inner end portion of the planetary gear carrier 46, there is a hollow shaft 48 extending to the left through the wall 44 of transmission 24 outwardly to a location near a component of wheel 8. The latter component is an externally splined ring 50 mounted on wheel 8. The left-hand end portion of hollow shaft 48 is provided with a splined shaft section 52. An internally splined sliding bushing 54 is adapted to be shifted between a right position, in which there is no engagement between sliding bushing 54 and ring 50, and a left position (illustrated in FIG. 1), in which the sliding bushing 54 is engaged both with the splined shaft section 52 of the output hollow shaft 48 of transmission 24 and with the splined shaft section of ring 50 and thus couples the wheel 8 with the rotational movement of hollow shaft 48. Sliding bushing 54 in the present embodiment is connected to a tube-like actuating member 56 which in turn is mounted to the left-hand wall 44 of transmission 24. The actuating member 56, at the left end thereof, projects into an outer circumferential groove of sliding bushing 54. The two positions described of sliding bushing 54 can be obtained by axially shortening or extending the actuating member 56.

Between the mounting component 10 and the coupling component 14 there is established a pluggable connection 60, with a first part 62 thereof being mounted on the mounting component 10 and a second part 64 thereof being mounted on the coupling component 14. The first part 62 is positioned adjacent the bottom 13 inside the mounting component 10. The second part 64 is positioned at the left-hand end portion of coupling component 14. In the assembled state shown in FIG. 1, the pluggable connection 60 is closed, i.e., the line sections coming from the left and terminating in first part 62 are connected to the line sections coming from the right and terminating in second part 64. However—as will still be described in more detail further below—, when the coupling component 14 along with drive motor 22 and transmission 24 is demounted from mounting component 10 and thus from the supporting component 2 in its entirety, the pluggable connection 60 is opened and the afore-mentioned line sections are separated from each other. Further details concerning the pluggable connection 60 and the line sections will be described further below. The line sections leading to first part 62 are extended outwardly to the left through one or more openings in the bottom 14 of mounting component 10. The line sections extending from the second part 64 extend to corresponding locations in drive motor 22 or transmission 24, in particular to the windings of stator 28.

FIG. 1 reveals a central mounting bolt 66 extending through all of the coupling component 14, the second part 64 of pluggable connection 60, the first part 62 of pluggable connection 60 and the bottom 13 of mounting component 10. At both ends of mounting bolt 66, there are provided threaded nuts 68; as an alternative, it is also possible to provide an enlarged mounting bolt head at one end. When the right-hand nut in FIG. 1 is released, the coupling component 14 together with drive motor 22, transmission 24 and second part 64 of pluggable connection 60 can be withdrawn/demounted towards the right from the mounting component 10 and thus from the supporting component 2. In assembling these parts, nut 68 is tightened so that the coupling component 14 along with drive motor 22 and transmission 24 is fixed to the mounting component 10 and thus to the supporting component 2 in total, inclusive of the described non-rotatable fixation between coupling component 14 and mounting component 10 and closure of the pluggable connection 60.

Figure 2:
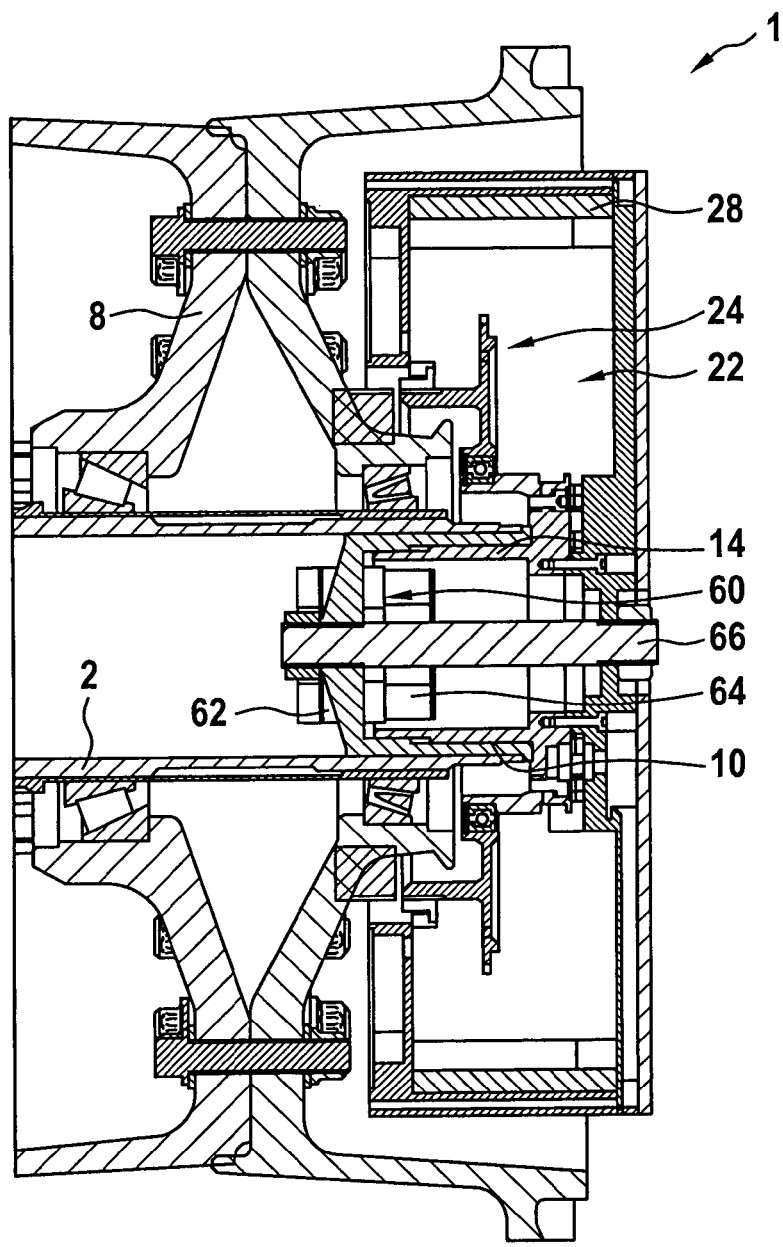
FIG. 2 shows a wheel drive unit in the attached state in a sectional view containing the central axis thereof.

FIG. 2 illustrates a wheel drive unit 1, a supporting component 2 of an aircraft running gear and a wheel 8 of the aircraft running gear, which are all designed quite similar to FIG. 1. However, the components shown in FIG. 2 are drawn more accurately and in the manner of a construction drawing. For ease of illustration, the drawing shows only few parts of the drive motor 22 and the transmission 24. The parts are shown in FIG. 2 using the same numerals as those introduced in FIG. 1.

Figure 3:
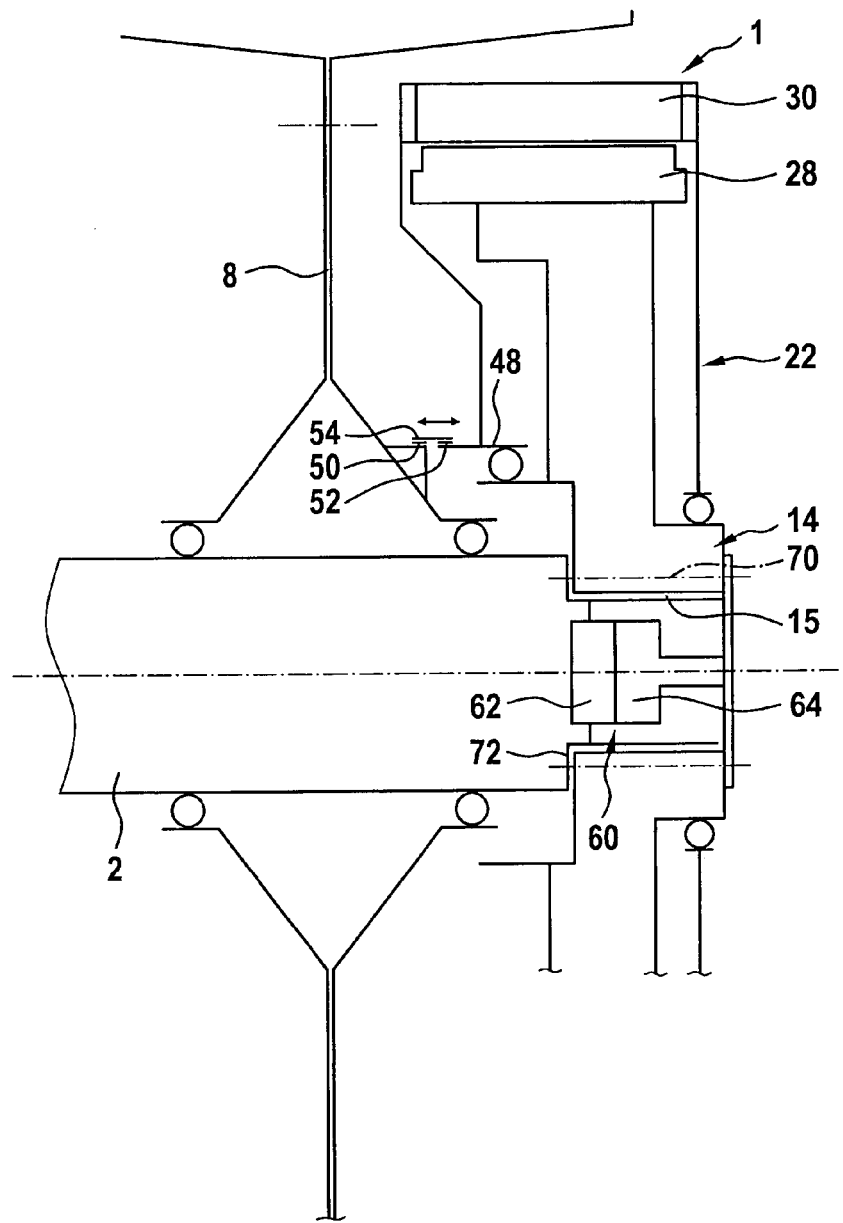
FIG. 3 shows a further embodiment of a wheel drive unit in the attached state in a sectional view containing the central axis of the wheel drive unit, with part of the wheel drive unit being cut away.

The further embodiment of a wheel drive unit 1 according to the invention, as shown in FIG. 3, differs from the wheel drive unit 1 of FIG. 1 in essence in the following aspects:

There is no longer a mounting component in the sense of the embodiment according to FIG. 1. Instead the supporting component 2 of the aircraft running gear 4, in its right-hand end portion of FIG. 3, is designed such that a coupling component 14 can be mounted thereon. The first part 62 of pluggable connection 60 is mounted in FIG. 3 in the right-hand end portion of supporting component 2. For mounting the coupling component 14 to the supporting component 2, there are provided circumferentially distributed, axially extending bolts 70 (of which only the central axes are illustrated in FIG. 3). Bolts 70 are threaded to a radially inwardly extending shoulder 72 of supporting component and are accessible from the right through corresponding openings in the right-hand end wall of rotor 30 of drive motor 22. Instead of this design, a central bolt 66 as in FIGS. 1 and 2 could be provided. The right-hand end portion of the supporting component 2 and the coupling component 14 (=central portion of the stator 28) are in non-rotatable engagement via a spline shaft connection 15. The drive motor 22 is an electric motor in this embodiment as well, with the statements made with respect to the embodiment of FIG. 1 concerning permanent magnets, windings, power supply to the windings, time control of the winding currents, etc., being applicable for the embodiment according to FIG. 3 as well.

Two further essential differences with respect to the embodiment of FIG. 1 are that the drive motor 22 now has an outer rotor 30 and an inner stator 28 and that there is no transmission 24 present. The left-hand end wall of rotor 30 is extended radially inside such that a splined shaft section 52 is provided there which, by means of the sliding bushing 54, can be engaged with or disengaged from the ring 50 of wheel 8 so as to establish or interrupt a torque-transmitting connection between rotor 30 and wheel 8.

Figure 4:
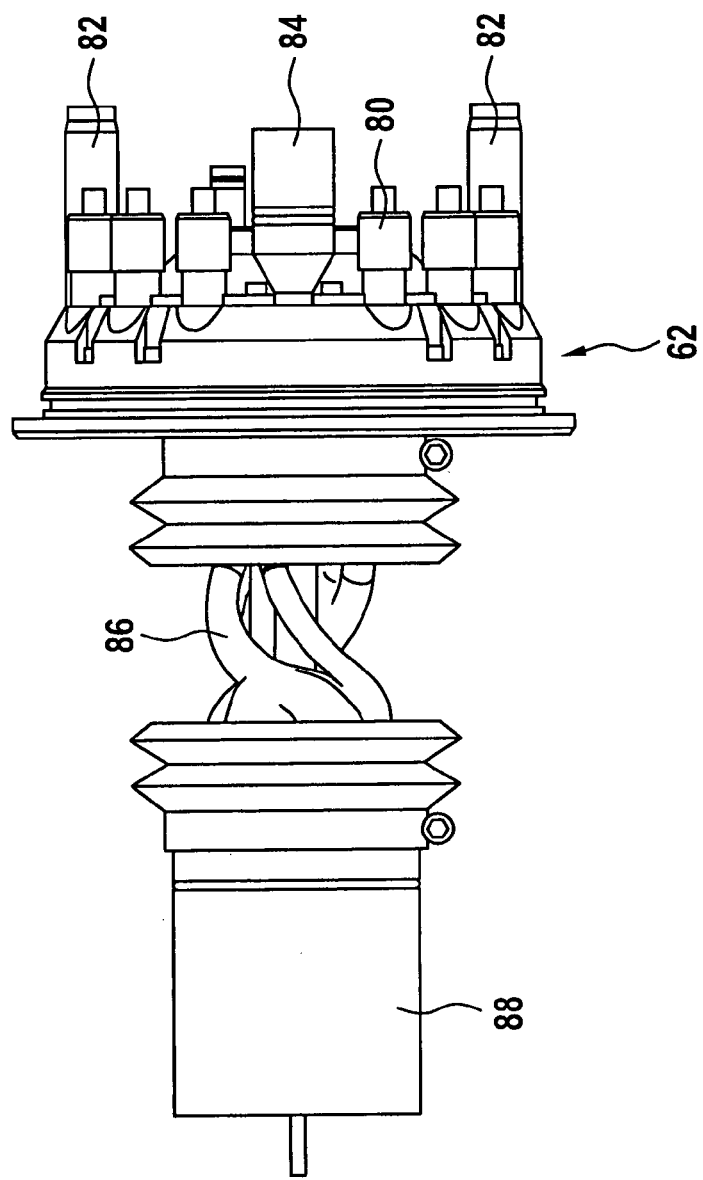
FIG. 4 shows a first part of a pluggable connection in an enlarged scale.

FIG. 4 shows an embodiment of a first part 62 of a pluggable connection 60 in an enlarged view. The first part 62 of pluggable connection 60 contains four groups of three plugs each for supplying electric power to the windings of the stator 28 of the electric motor 22, two plugs 82 for transmitting electric signals, two pluggable connection halves 84 for coolant supply and coolant discharge. This first part 62 of pluggable connection 60, as already described, is mounted on the mounting component 10 (FIG. 1) or on the supporting component 2 (FIG. 3). All necessary lines 86 extend in a common enclosure 88 through suspension strut 6 or externally of suspension strut 6 into the aircraft.

Figure 5:
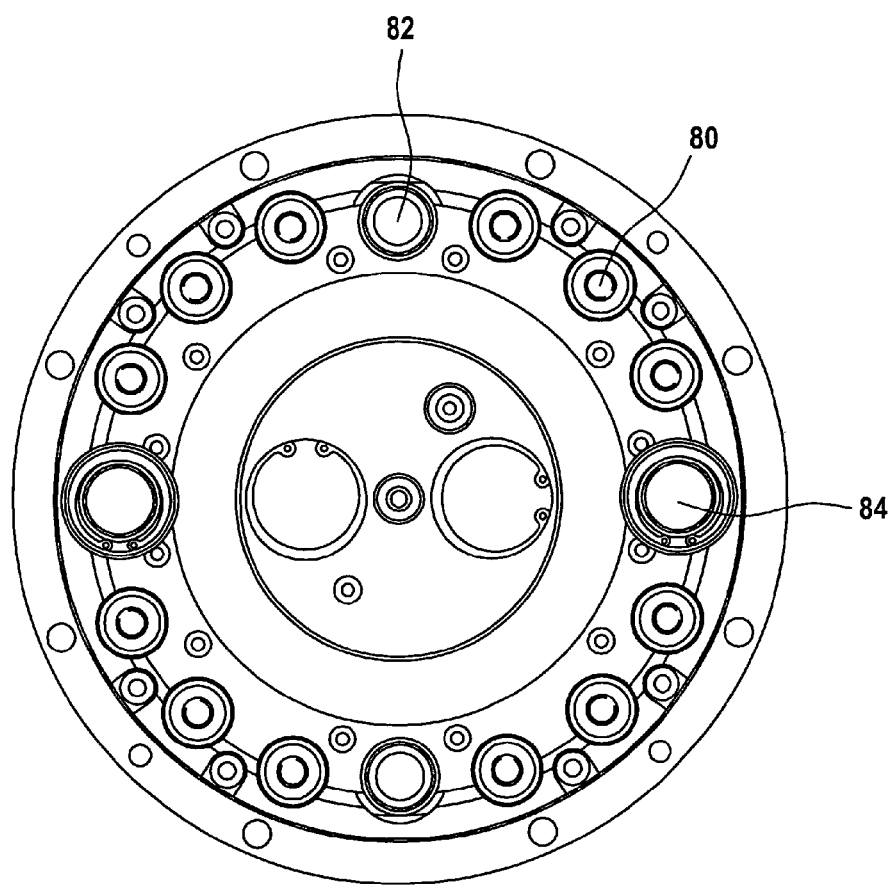
FIG. 5 shows a second part of a pluggable connection in an enlarged scale.

FIG. 5 illustrates the design of the second part 64 of the pluggable connection 60 in an end view. The view shows the pluggable connection halves 80 for electric power, the pluggable connection halves 82 for electric signals and the pluggable connection halves 84 for coolant.

Figure 6:
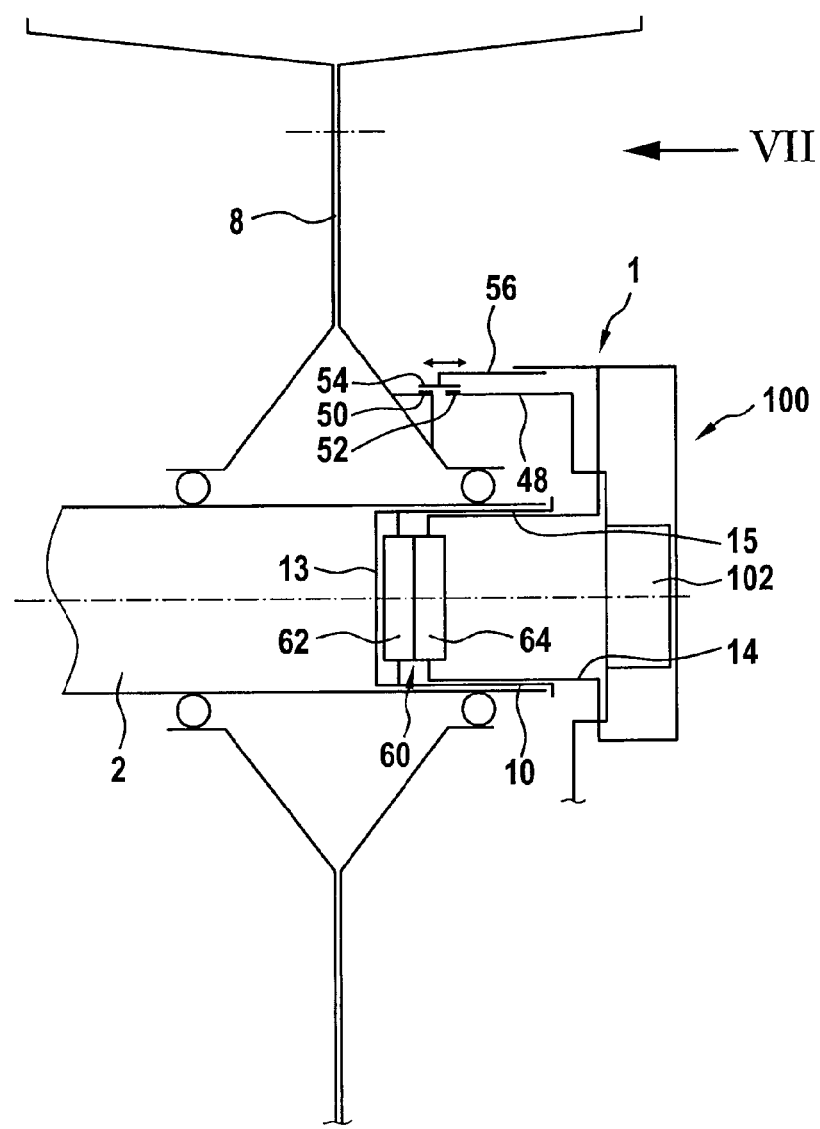
FIG. 6 shows a further embodiment of the wheel drive unit in the attached state, partly in a sectional view containing the central axis of the wheel drive unit, with part of the wheel drive unit being cut away.
Figure 7:
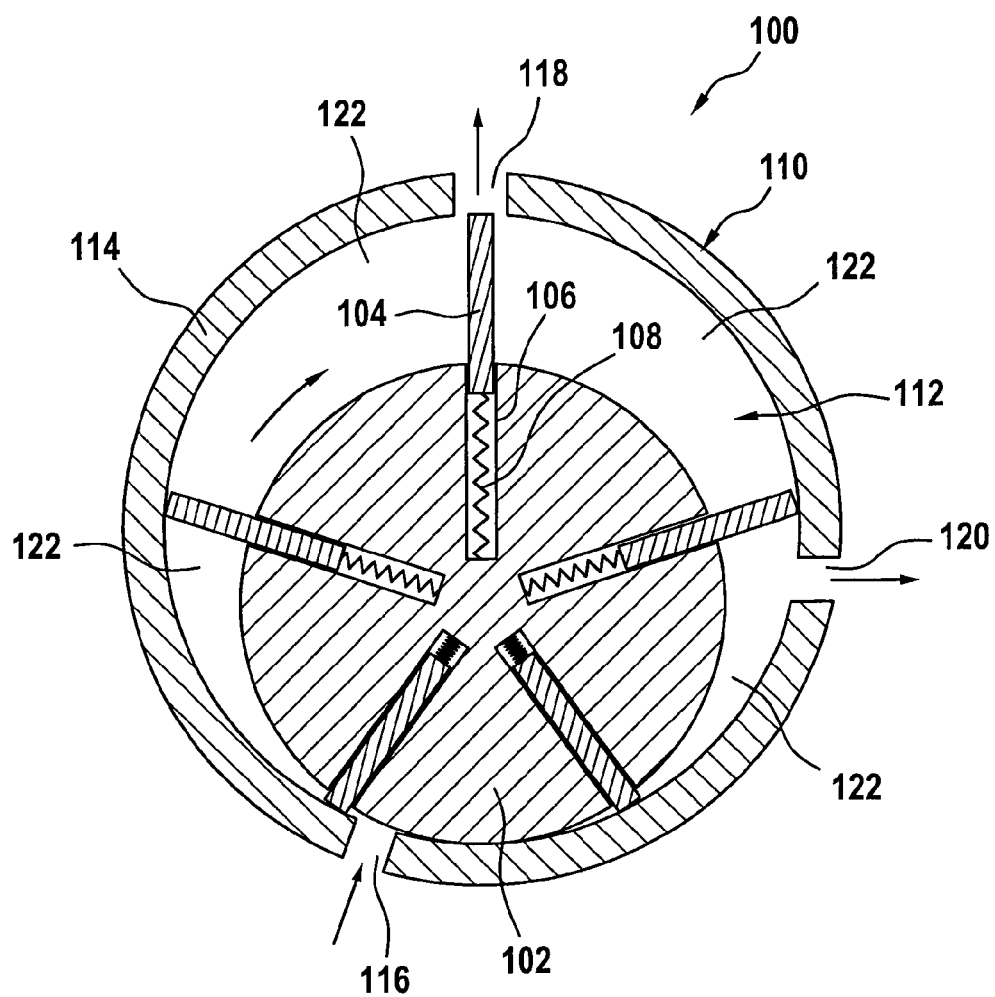
FIG. 7 shows the drive motor of the wheel drive unit of FIG. 6 in a sectional end view according to arrow VII in FIG. 6.

FIGS. 6 and 7 illustrate an embodiment in which the drive motor illustrated is a compressed air motor 100 instead of an electric motor. The example illustrated is a vane motor, with vane motors of the construction type illustrated existing both in the form of compressed air motors (operated by compressed air) and in the form of hydraulic motors (operated by hydraulic liquid under considerable pressure). Comparing motors with the same output torque, hydraulic motors as a rule are smaller than compressed air motors, as it is usually possible to use hydraulic liquid under higher pressure than in case of compressed air motors. The type of construction illustrated is a vane motor; however, other construction types, e.g., toothed ring motor, crescent-type motor, radial piston motor, gear wheel motors can be chosen as well.

The sectional view of FIG. 7 illustrates the mode of operation of a vane motor 100. A rotor 102 having a cylindrical main body carries, e.g., five vanes 104 distributed across the circumference thereof, with smaller and larger vane numbers being possible as well. The vanes 104 are each plate-shaped and extend in axial direction of the rotor 102 on the one hand and in radial direction on the other hand. The vanes 104 are each seated in a complementary slot 106 of rotor 102 and are each biased radially outwardly by a spring 108. It is optionally possible, by way of a shoulder, not shown, on vane 104 and a counter-shoulder, not shown, in slot 106, to prevent the respective vane 104 from moving completely radially outwardly from the respective slot 106.

A housing 110 of vane motor 100 has an inner space 112 confined by a wall 114 extending elliptically on the inside. Extending through the wall 114 are a supply channel 16 for compressed air, a main discharge channel 118 for air and a posterior discharge channel 120 for air. Upon rotation of rotor 102 in clockwise direction in FIG. 7, the respective space 122 between two adjacent vanes 104 is increased from the supply channel 116 to the main discharge channel 118. The expanding compressed air exerts pressure on the leading vane 104 that is preceding in the direction of rotation of rotor 102. The posterior discharge channel 120 serves to vent the respective space 122 as completely as possible before new compressed air enters through the supply channel 116.

The preceding description made reference to a compressed air motor. As an alternative, there may also be provided a hydraulic motor. In case of a hydraulic motor designed as a vane motor, the operational sequence is the same, with the positioning of the supply and discharge channels being possibly different. Compressed air motors and hydraulic motors of the construction types addressed here are known and available in the market.

FIG. 6 shows—in more schematic manner as in FIG. 1—that there are provided a mounting component 10 and a coupling component 14 as in case of FIG. 1. The mounting component 10 is releasably mounted on the supporting component 2 that it is fixed in relation to the supporting component both in axial direction and in circumferential direction. The coupling component 14 is releasably mounted to the mounting component 10 such that is fixed in relation to the mounting component 10 both in axial direction and in circumferential direction. In the mounted state of the coupling component 14, the pluggable connection 60 is in the connecting state.

The housing of the compressed air motor 100 or of the hydraulic motor is connected to the coupling component 14 such that the coupling component 14, via the mounting component 10, provides for torque support of the compressed air motor 100 or of the hydraulic motor.

It is emphasized that—as in changing from the embodiment according to FIG. 1 to the embodiment according to FIG. 3—the embodiment of FIGS. 6 and 7 may be modified as well such that there is no mounting component 10, and that the coupling component 14 is anchored to the supporting component 2 directly in axially fixed and non-rotatable, but releasable manner.

The embodiment according to FIGS. 6 and 7, analogously to the embodiments of FIGS. 1 and 3, has a sliding bushing 54 so that the splined shaft section 52 of the output hollow shaft 48 of the compressed air motor 100 or of the hydraulic motor can be selectively coupled to the ring 50 of wheel 8 in torque-transmitting manner, or be separated from the same.

Figure 8:
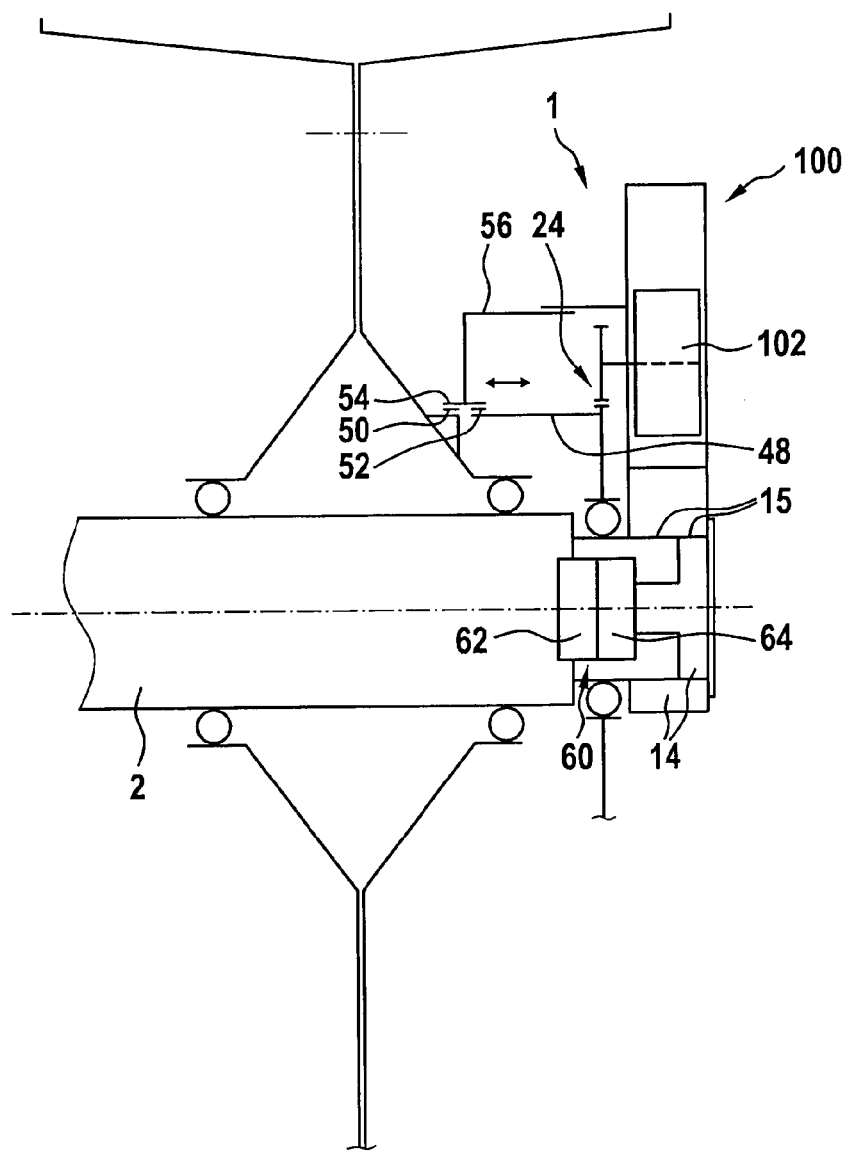
FIG. 8 shows a further embodiment of a wheel drive unit in the attached state, partly in a sectional view containing the central axis of the wheel drive unit, with part of the wheel drive unit being cut away.

FIG. 8 illustrates an embodiment of a wheel drive unit 1 with compressed air motor 100 or hydraulic motor, in which a transmission 24 is provided between motor 100 and the output to wheel 8. This transmission is a single-stage spur gear unit. The coupling component 14, without the presence of a mounting component 10, is releasably mounted on the supporting component 2. As regards the axially fixed and non-rotatable anchoring of the coupling component 14 to the supporting component 2 of the aircraft running gear, and also the sliding bearing 54, the statements made hereinbefore in relation to the preceding embodiments are applicable.

When the wheel drive unit according to one embodiment of the invention is to be provided for attachment to a running gear or chassis component of a non-railbound land vehicle, all statements concerning the embodiments made hereinbefore are applicable analogously. Instead of the supporting component 2 of the aircraft running gear 6, a supporting component of a chassis of a non-railbound vehicle will be present then. As with non-railbound vehicles, which are not airplanes, the wheel loads as a rule are considerably lower than with airplanes, the supporting component 2 typically will be dimensioned smaller.

The various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wheel drive unit for attachment to an aircraft running gear at a position where the aircraft running gear has the configuration of a hollow shaft, the aircraft running gear having at least one wheel rotatable about a central axis of the hollow shaft, said wheel drive unit comprising:
   (a) a mount adapted to be non-rotatably fixed to the hollow shaft of the aircraft running gear;
   (b) a coupler releasably anchored to the mount and non-rotatably fixed by engagement with the mount or the hollow shaft of the aircraft running gear;
   (c) a drive motor or a drive motor with subsequent transmission being supported by the coupler such that the coupler provides for torque support of the drive motor or of the drive motor with subsequent transmission;
   (d) a pluggable connection at a position corresponding to the central axis of the hollow shaft of the aircraft running gear, the pluggable connection for connecting at least one pair of electric line sections and/or at least one pair of fluid line sections, a first part of the pluggable connection being on the mount and a second part of the pluggable connection being on the coupler;

(e) wherein the torque output of the drive motor or of the subsequent transmission is adapted to establish a torque-transmitting connection to the at least one wheel of the aircraft running gear when the wheel drive unit is attached to the aircraft running gear; and (f): wherein the wheel drive unit, without the mount, when the anchoring to the mount is released, is demountable from the aircraft running gear which also separates the first and second parts of the pluggable connection from each other.

2. A wheel drive unit according to claim 1, wherein the drive motor is one of an electric motor, an electronically commutated electric motor composed with permanent magnets, a hydraulic motor, and a compressed air motor.

3. A wheel drive unit according to claim 2, wherein the pluggable connection is designed to connect plural pairs of electric power line sections for the electric motor or connect at least two pairs of hydraulic line sections for the hydraulic motor or at least one pair of compressed air line sections for the compressed air motor.

4. A wheel drive unit according to claim 1, wherein the subsequent transmission is a planetary gear system.

5. A wheel drive unit according to claim 1, wherein at least one of (i) a rotor of the drive motor and (ii) a planetary gear carrier of the subsequent transmission is rotatably supported by the coupler.

6. A wheel drive unit according to claim 1, wherein the non-rotatable fixation between the coupler and the mount is a spline shaft connection.

7. A wheel drive unit according to claim 1, wherein at least one bolt extends through the drive motor or the drive motor with subsequent transmission, the coupler, and the mount thereby connecting the drive motor or the drive motor with subsequent transmission, the coupler, and the mount together.

8. A wheel drive unit according to claim 1, wherein the pluggable connection is designed to connect at least one pair of electric signal line sections or connect at least one pair of fluid line sections for liquid or gaseous cooling fluid.

9. A wheel drive unit according to claim 1, wherein the pluggable connection comprises all terminals provided for the wheel drive unit.

10. A wheel drive unit according to claim 1, wherein at least part of the terminals or line sections provided in the pluggable connection for liquid or gas is designed to be at least one of self-closing upon separation of the pluggable connection and self-venting.

11. A wheel drive unit according to claim 1, wherein at least one of the first and second parts of the pluggable connection is equipped with a shield for reducing electromagnetic radiation.

12. A wheel drive unit for attachment to an aircraft running gear at a position where the aircraft running gear has the configuration of a hollow shaft, the aircraft running gear having at least one wheel rotatable about a central axis of the hollow shaft, said wheel drive unit comprising:

(a) a coupler adapted to be non-rotatably fixed to the hollow shaft of the aircraft running gear;

(b) a drive motor or a drive motor with subsequent transmission being releasably supported by means of the coupler such that the coupler provides for torque support of the drive motor or of the drive motor with subsequent transmission; and (c) a pluggable connection at a position corresponding to the central axis of the hollow shaft of the aircraft running gear, the pluggable connection for connecting at least one pair of electric line sections and/or at least one pair of fluid line sections, a first part of the pluggable connection being on the hollow shaft of the aircraft running gear of the aircraft running gear and a second part of the pluggable connection being on the coupler;

(d) wherein the torque output of the drive motor or of the subsequent transmission is adapted to establish a torque-transmitting connection to the at least one wheel of the aircraft running gear when the wheel drive unit is attached to the aircraft running gear; and (e) wherein the wheel drive unit, by release of the mounted state of the coupler on the hollow shaft of the aircraft running gear, is demountable from the aircraft running gear which also separates the first and second parts of the pluggable connection from each other.

13. A wheel drive unit according to claim 12, wherein the drive motor is one of a hydraulic motor, a compressed air motor, an electric motor, and an electronically commutated electric motor composed with permanent magnets.

14. A wheel drive unit according to claim 12, wherein the subsequent transmission is a planetary gear system.

15. A wheel drive unit according to claim 12, wherein at least one of (i) a rotor of the drive motor and (ii) a planetary gear carrier of the subsequent transmission is rotatably supported by the coupler.

16. A wheel drive unit according to claim 12, wherein the non-rotatable fixation between the coupler and the hollow shaft of the aircraft running gear is a spline shaft connection.

17. A wheel drive unit according to claim 12, wherein the pluggable connection is designed to connect plural pairs of electric power line sections for the electric motor, or to connect at least two pairs of hydraulic line sections for the hydraulic motor or at least one pair of compressed air line sections for the compressed air motor.

18. A wheel drive unit according to claim 12, wherein the pluggable connection is designed to connect at least one pair of electric signal line sections or to connect at least one pair of fluid line sections for liquid or gaseous cooling fluid.

19. A wheel drive unit according to claim 12, wherein the pluggable connection comprises all terminals provided for the wheel drive unit.

20. A wheel drive unit according to claim 12, wherein at least part of the terminals or line sections provided in the pluggable connection for liquid or gas is designed to be at least one self-closing upon separation of the pluggable connection and self-venting.

21. A wheel drive unit according to claim 12, wherein at least one of the first and second parts of the pluggable connection is equipped with a shield for reducing electromagnetic radiation.

* * * * *